US009288557B2

(12) United States Patent
Zhou

(10) Patent No.: US 9,288,557 B2
(45) Date of Patent: Mar. 15, 2016

(54) METHOD AND APPARATUS FOR ANALYZING THE SPECTRUM OF RADIO-FREQUENCY SIGNALS USING UNAMPLIFIED FIBER OPTIC RECIRCULATION LOOPS

(71) Applicant: U.S. Army Research Laboratory ATTN: RDRL-LOC-I, Adelphi, MD (US)

(72) Inventor: Weimin Zhou, Rockville, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 155 days.

(21) Appl. No.: 13/955,042

(22) Filed: Jul. 31, 2013

(65) Prior Publication Data
US 2013/0315590 A1 Nov. 28, 2013

Related U.S. Application Data

(60) Provisional application No. 61/818,000, filed on May 1, 2013.

(51) Int. Cl.
*H04J 14/04* (2006.01)
*H04B 10/00* (2013.01)
(Continued)

(52) U.S. Cl.
CPC ......... *H04Q 11/0003* (2013.01); *H01Q 3/2676* (2013.01); *H04B 2210/006* (2013.01)

(58) Field of Classification Search
CPC ... H04Q 11/0003; H04Q 11/00; H04B 1/7156
USPC .................... 398/16, 48, 45; 342/375; 385/27
See application file for complete search history.

(56) References Cited

U.S. PATENT DOCUMENTS 4,708,421 A * 11/1987 Desurvire ............ G02B 6/2861
359/334

(Continued)

OTHER PUBLICATIONS

"Demonstration of an RF-Photonic Microwave Channelizer Using an Optical Fiber Recirculating Loop", Michael Stead and Weimin Zhou, Army Research Laboratory, Adelphi MD, and Ming-Chiang Li, Liceimer, Mitchellville, MD, 6 Pages, Mar. 10, 2011.

(Continued)

*Primary Examiner* — Ken Vanderpuye
*Assistant Examiner* — Abbas H Alagheband
(74) *Attorney, Agent, or Firm* — Alan I. Kalb

(57) ABSTRACT

An apparatus for generating a frequency spectrum of an RF signal comprising a gate switch for generating a series of pulses from a laser of wavelength lambda modulated by an input RF signal, a first fiber optical loop for circulating a first percentage of a first pulse of the series of pulses from the gate switch, for a predetermined number of cycles n where each cycle takes time t1, a second fiber optical loop for conducting a second percentage of the first pulse for predetermined number of cycles "k", where each cycle takes time t2, where $t2*k=t1*n$, a first switch with a first state for coupling the first pulse from the gate switch to a coupler, the coupler coupling the first pulse into the first fiber optical loop and tapping replicas of the pulse from the first fiber optical loop, and a second state for coupling the second percentage of the first pulse to the coupler to increase intensity of the tapped replica pulses, a processor for correlating the replicas of the pulse with each other to produce a set of data points comprising a plurality of multiplexed correlated pulses and transforming the data points into a channelized frequency spectrum of the input RF signal.

16 Claims, 3 Drawing Sheets

(51) Int. Cl.
    *G02B 6/26* (2006.01)
    *G01S 19/35* (2010.01)
    *H04Q 11/00* (2006.01)
    *H01Q 3/26* (2006.01)

(56) References Cited

U.S. PATENT DOCUMENTS

| | | | | |
|---|---|---|---|---|
| 5,585,714 | A * | 12/1996 | Dawber | G01R 23/17 324/76.37 |
| 6,023,360 | A * | 2/2000 | Morioka | H04J 14/0223 398/1 |
| 6,282,336 | B1 * | 8/2001 | Riza | G02F 1/31 385/21 |
| 6,891,149 | B1 * | 5/2005 | Lewis | H01S 3/1303 250/216 |
| 7,003,180 | B2 * | 2/2006 | Richardson | G02F 1/3515 385/1 |
| 7,876,498 | B1 * | 1/2011 | Honea | H01S 3/06758 359/341.41 |
| 8,363,312 | B1 * | 1/2013 | Honea | H01S 3/06758 359/341.41 |
| 8,532,486 | B2 * | 9/2013 | Stead | H04B 10/2575 398/116 |
| 8,779,977 | B2 * | 7/2014 | Zhou | H01Q 1/28 342/368 |
| 2001/0022877 | A1 * | 9/2001 | Sadot | G02F 1/225 385/27 |
| 2004/0156572 | A1 * | 8/2004 | Richardson | G02F 1/3515 385/1 |
| 2009/0002236 | A1 * | 1/2009 | Zhou | H01Q 3/2676 342/375 |
| 2013/0209107 | A1 * | 8/2013 | Stead | H04B 10/2575 398/116 |
| 2014/0341565 | A1 * | 11/2014 | Jolly et al. | 398/25 |
| 2015/0030039 | A1 * | 1/2015 | Wise et al. | 372/6 |

OTHER PUBLICATIONS

"New Channelized Receiver" Ming-Chiang Li, Transaction of the AOC, 1, pp. 82-105 (2004).

* cited by examiner

METHOD AND APPARATUS FOR ANALYZING THE SPECTRUM OF RADIO-FREQUENCY SIGNALS USING UNAMPLIFIED FIBER OPTIC RECIRCULATION LOOPS

GOVERNMENT INTEREST

Governmental Interest—The invention described herein may be manufactured, used and licensed by or for the U.S. Government.

FIELD OF INVENTION

Embodiments of the present invention generally relate to radio-frequency receiving system and, more particularly, to a method and apparatus for analyzing the spectrum of radio-frequency signals using unamplified fiber optic recirculation loops.

BACKGROUND OF THE INVENTION

Typically, public radio-frequency (RF) communications are transmitted at a preconfigured frequency so that a receiver can tune to the particular frequency and receive the communications. In contrast, private communications and military RF systems are transmitted across multiple frequencies (e.g., using frequency hopping and/or spread spectrum techniques) in a short time window. In some instances, these private communications need to be captured by unintended receivers, e.g., law enforcement agencies, military organizations and the like. However, difficulties arise when a communication is transmitted across various frequencies, i.e., frequency hopping is employed, in the form of short RF pulses where each broadcast is on a different frequency.

Without knowing the frequency hopping pattern, a receiver must attempt to capture all signals in the relevant band. Typically, all the signals within the band are digitized and then processed using a very high speed digital signal processing (DSP) system. Such high speed DSP systems are very costly to manufacture, operate and maintain. In some instances, the band of interest is divided into sub-bands and each sub-band is digitized and processed in a corresponding DSP. Such sub-band channelization enables many signals to be quickly processed in parallel using less expensive DSP circuits (i.e., lower speed circuits). However, even a channelized, broad band receiver is very expensive to manufacture, operate and maintain.

Recently, optical systems have found use in broad band signal processing wherein the received RF signals are used to modulate a light signal and the light signal is processed in an optical signal processing section of the receiver. Such techniques, unfortunately, are prone to resonant noise and system instability due to the use of amplifiers within the optical signal processing section.

Therefore, there is a need in the art for an improved method and apparatus for analyzing the spectrum of radio-frequency signals using a fiber optic recirculation loop.

BRIEF SUMMARY OF THE INVENTION

Embodiments of the present invention relate to a method and an apparatus for generating a frequency spectrum of an RF signal comprising a gate switch for generating a series of pulses from a laser of wavelength lambda ($\lambda$) modulated by an input RF signal, a first fiber optical loop for circulating a first percentage of a first pulse of the series of pulses from the gate switch, for a predetermined number of cycles n where each cycle takes time t1, a second fiber optical buffer delay loop for conducting a second percentage of the first pulse for a predetermined number of cycles "k", where each cycle takes time t2, where $t2*k=t1*n$, a first switch with a first state for coupling the first pulse from the gate switch to a coupler, the coupler coupling the first pulse into the first fiber optical loop and tapping replicas of the pulse from the first fiber optical loop, and a second state for coupling the second percentage of the first pulse to the coupler to increase intensity of the tapped replica pulses, a processor for correlating the replicas of the pulse with each other to produce a set of data points comprising a plurality of multiplexed correlated pulses and transforming the data points into a channelized frequency spectrum of the input RF signal.

Embodiments of the present invention further relate to a method and an apparatus for generating a frequency spectrum of an RF signal comprising a gate switch for generating a series of pulses from a laser of wavelength lambda modulated by an input RF signal, fiber optical loop for circulating a first pulse of the series of pulses from the gate switch, for a predetermined number of cycles n where each cycle takes time t1, a first switch, coupled to the gate switch, in a first state for coupling the first pulse from the gate switch to a coupler, the coupler coupling a first percentage of the first pulse into the fiber optical loop and tapping a second percentage of the first pulse out of the first fiber optical loop as a replica pulse, and a second state for coupling the fiber optical loop to the coupler, and a processor for correlating a predetermined amount of replicas of the pulse with each other to produce a set of data points comprising a plurality of multiplexed correlated pulses and transforming the data points into a channelized frequency spectrum of the input RF signal.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Embodiments of the present invention comprise an apparatus for generating a large number of re-circulated replica signal pulses in the time domain from a single input optical pulse that carry a RF signal with two side bands while avoiding noise by use of an unamplified, extreme low-loss, fiber-optic recirculation loop circuit. In some embodiments fiber-optic recirculation loop circuit comprises two fiber optical loops, where one fiber optical loop recycles and introduces a buffer delay in the original input pulse to augment the intensity of the pulse signal in the other fiber optical loop. Each replica pulse carries two copies of the RF signal, the copies having a relative time delay due to the chromatic dispersion of the fiber optical loop. The replica signal pulses are then coupled to a photodetector to obtain the RF signal that is expanded in time as a series of delayed pulses that may be later correlated. A processor is configured to perform a Fast-Fourier Transform (FFT), using a transform module, on the correlated pulses, generating a channelized frequency spectrum.

When searching for unknown RF signals, at ten of hundreds of gigahertz, thousands, or possibly, millions of transmitter signal may be received by a wide bandwidth receiver, making it difficult to determine which signal may be a signal of interest. In such a situation, higher frequency resolution is desired in order to search the carrier frequency of the signal of interest and then, perform intermediate frequency (IF) down-converting. Accordingly, a low-loss fiber optic recirculation circuit can be used to perform such an analysis using a significant amount of generated pulses, as described in FIG. 1. However, to minimize processing time, it is desirable to perform a two step searching process by performing an, initial low-resolution "quick" search by using a single fiber optical loop circuit as shown in FIG. 2 that provides only a small amount of generated pulses for analysis. Once a signal of interest is found, the high resolution processor shown in FIG. 1 is used to narrow down the frequency channel as described below.

Figure 1:
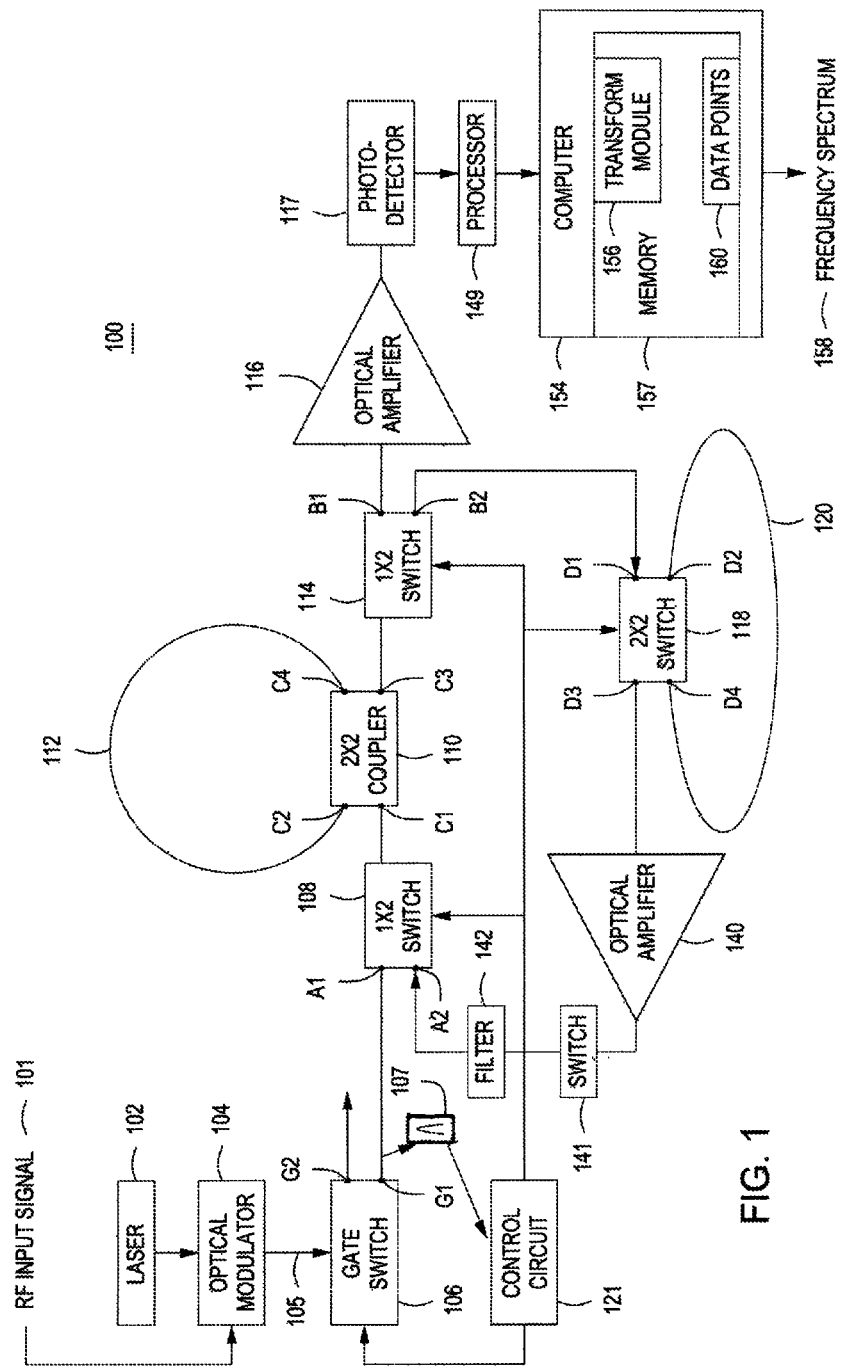
FIG. 1 is a block diagram of an apparatus for detecting radio-frequency signals using a fiber optic recirculation circuit in accordance with exemplary embodiments of the present invention.
Figure 2:
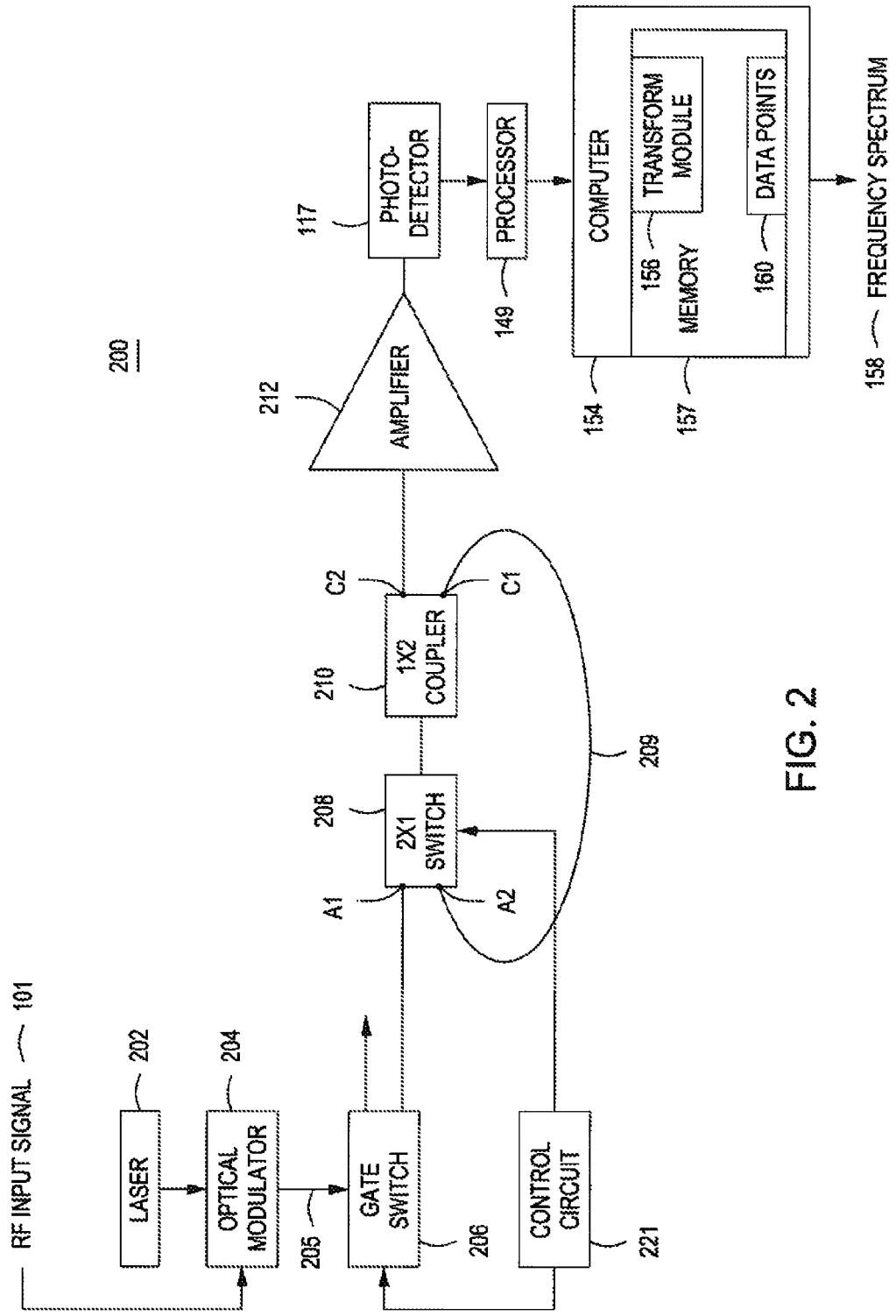
FIG. 2 is a block diagram of an apparatus for detecting radio-frequency signals using a fiber optic recirculation circuit in accordance with another exemplary embodiment of the present invention.

FIG. 1 is a block diagram of an apparatus 100 for detecting radio-frequency (RF) signals using fiber optic recirculation loops in accordance with exemplary embodiments of the present invention. The apparatus 100 comprises a laser 102, an optical modulator 104, a gate switch 106, a 1×2 switch 108, a 2×2 coupler 110, a fiber optic recirculation loop 112, a second 1×2 switch 114, an amplifier 116, a 2×2 coupler 118, a second fiber optical recirculation loop 120, a control circuit 121, a photo-detector 117 and a computer 154. The computer 154 comprises a processor 159 and memory 157. The memory 157 comprises a transform module 156 and stores data points 160.

According to an exemplary embodiment of the present invention, the apparatus 100 processes an RF input signal 101 and produces frequency spectrum 158 representing information carried by the RF input signal 101. The input signal 101 is an RF signal and the laser 102 is a carrier wave light signal.

The RF input signal 101 may be received via a conventional RF front end (not shown) comprising, for example, an antenna, low noise amplifier and various filters. The choice of components and arrangement depends upon the nature of the signals that are to be processed. The selection of components and their arrangement is a design choice capable of being made by anyone with skill in the RF communication arts.

The laser 102 provides laser light of wavelength lambda (λ). The optical modulator 104 modulates light from the laser 102 with the RF input signal 101, creating an RF modulated light wave 105 with two sidebands around the laser carrier in the frequency domain. According to an exemplary embodiment, the laser 102 is a continuous wave laser (CWL). In other embodiments, two lasers with varying wavelengths are generated and modulated by the modulator 104. Also according to an exemplary embodiment of the present invention, the optical modulator 104 is a Mach Zehnder modulator, though those of ordinary skill in the art will recognize that any equivalent modular may be used. The gate switch 106 (e.g., an optical gate switch) converts the modulated light into an RF modulated optical pulse. After an initial output pulse 107 of the modulated light wave 105 leaves the gate switch 106, the gate switch 106 closes so that for a predetermined length of time further pulses cannot enter the loop 112 to cause distortion and noise. Thereafter, the control circuit 121 controls opening and closing of the gate switch 106 so as to create a series of pulses which enter the loop 112 in a periodic fashion.

According to an exemplary embodiment, the optical gate switch 106 is a fast and high extinction ratio optical gate switch, and generates short pulse 107 from the modulated laser light 105 at an output port G1. According to some embodiments, the optical power of the pulse generated at port G1 has a range of 10 mW to 100 mW. The 1×2 switch 108 couples the output pulse from output port G1 to input port C1 of the 2×2 coupler 110. The gate switch 106 also has an output port G2, which may be used to analyze the RF signal by another circuit (not shown), unrelated to the apparatus 100. The coupler 110 is used to couple the output pulse 107 into and out of the fiber recirculation loop 112. According to an exemplary embodiment, the length of loop 112 is approximately 1.3 Km if regular telecom fiber is used and the total RF bandwidth is about 50 GHz.

Initially, the 1×2 switch 108 is set to a first state by the control circuit 121 when the gate switch 106 generates the pulse 107, where the input A1 is coupled to the output of the switch 108. The 1×2 switch 108 has a second state, where the input A2 is coupled to the output of switch 108. After the input signal pulse 107 passes though switch 108, the switch 108 will be switched to the second state and remains in that the second state for one full cycle of operation. Accordingly, when 1×2 switch 108 is set to the first state, the initial pulse 107 is coupled by switch 108 into port C1 of coupler 110. The coupler 110 is a weak 2×2 optical coupler, by way of non-limiting example, the coupler 110 has a 5:95 ratio. For example, 5% of the signal is coupled into the loop 112 from output port C4, while 95% of the signal is coupled from output port C3 to the 1×2 switch 114.

According to exemplary embodiments, the coupler 110 comprises two adjacent wave guides (not shown), for example, a waveguide from input port C1 to output port C3 and a waveguide from input port C2 to output port C4. If a pulse is coupled with either one of the input ports, 95% of the pulse signal remains in the intended waveguide, while 5% is coupled off to the adjacent waveguide.

The first pulse 107 enters the coupler at input port C1. A first percentage (for example, 5%) of the power of the first pulse re-circulates in the loop 112, through output port C4, a predetermined number of times ("n"), while a second percentage (for example, 95%) of the pulse 107 is output at port C3. According to some embodiments, the pulse circulates in the loop 112 fifty times, i.e., n=50. According to other embodiments, n=35. Those of ordinary skill in the art will recognize that n is a variable parameter based on the length L1 of the loop 112, to accommodate for various frequency bandwidths. After the initial pulse, each time the pulse circulates the loop once and arrives at port C2 of the coupler 110, the pulse signal is split once again so that a second percentage (for example, 95%) of the signal goes back into the loop 112 (i.e., the waveguide from port C2 to C4 carries the majority of the pulse signal) and a first percentage (for example 5%) exits the loop at port C3. After the initial pulse circulates the loop 112 once, the control circuit 121 sets the switch 114 to a second state, where the switch 114 outputs only at port B1, so the 1×2 switch 114 taps out a replica pulse (or, alternatively, a pulse pair with sidebands, where two initial lasers are used instead of laser 102). If a pulse takes time VI to travel once fully through loop 112, where the loop length of loop 112 is L1, a series of "n" pulse replicas will be generated at port C3, each pulse separated by a time t1 from the subsequent pulse.

According to an exemplary embodiment, the loop 112 has a loss of approximately 0.17 db per kilometer and the length of loop 112 is about 1.3 km. Further, according to exemplary embodiments of the present invention, the loop length generally does not affect the ability to tap out replica pulse pairs, however loops with length less than one pulse width will cause overlap and distort results. The loop 112 may be a dispersion shifted fiber where there is non-dispersion around the operating wavelength of the light generated by laser 102.

Initially the 1×2 switch 114 is in a first state, where the input of switch 114 is coupled to output port B2 of switch 114, so that the input from port C3 is coupled directly to the output B2. After the initial pulse is output at output B2 of switch 114, the control circuit 121 sets switch 108 to a second state, where the input of switch 114 is coupled to the output port B1 of switch 114.

The initial pulse of the series of pulses is coupled from output port B2 of switch 114 to an input port D1 of the 2×2 switch 118. When the initial pulse is coupled to switch 118, the control circuit 121 controls the switch 118 so that the initial pulse at input port D1 is coupled so as to recirculate in the loop 120 through output port D4. After the initial pulse enters the loop 120, the control circuit 121 sets the switch 118 to the "D2-D4" setting where the input port D2 will couple the pulse to the output port D4, causing the pulse to travel into the loop 120, for a predetermined number of times ("k"). According to exemplary embodiments of the present invention, the loop 120 is significantly larger than loop 112. In some embodiments, the loop 120 is ten times the length of loop 112. The pulse travels through loop 120 to complete a single cycle in a predetermined duration of time t2. Accordingly, time k*t2 is the duration of time the pulse remains in loop 120, as well as the duration of time taken by the initial pulse to travel through loop 112 for n cycles.

After the pulse travels the loop 120 for n cycles in time k*t2, the control circuit 121 controls port D3 of the 2×2 switch 118 to be coupled to port A2 of switch 108, in order to allow the pulse to reenter the loop 112 via the coupler 110. By way of a non-limiting example, if n=35, five percent of the initial pulse will travel through the loop 112 thirty-five times (cycles) while 95% of the initial pulse travels through loop 120 "k" times. However, due to loss in the loop 112, as well as the successive tapping out of a portion of the pulse signal, the pulse signal will lose energy during each cycle. When the subsequent pulse exits the switch 108 and enters the loop 112, 95% of the initial pulse from loop 120 is coupled with the subsequent pulse via switch 108 and input C1, the signal intensity is increased, and so on for the next 35 pulses.

Optionally, this embodiment can be simplified by making k=1 and removing the 2×2 switch 118. Therefore the total length of the fiber loop 120 is n times the length of the first loop 112. According to another embodiment, an optional optical amplifier 140 may be added in the buffer delay loop 120 to compensate for fiber loss so that the recycled subsequent first pulse sent to C1 has the same amplitude of the original first input pulse. According to yet another embodiment, an optional switch 141 and an optical filter 142 may be added after the optional amplifier 140 as a time domain and frequency domain noise filter to filter out the noise generated from the amplifier 140.

After the initial pulse enters switch 114 and outputs at port B2, the control circuit 121 switches the output of switch 114 to output port B1. This allows 5% of the pulse signal in the loop 112 to be tapped out of the loop to generate a replica pulse at output port B1. The series of n pulses are then coupled from the output port B1 of switch 114 to the optical amplifier 116. According to an exemplary embodiment of the present invention, the amplifier 116 is an Erbium doped fiber amplifier (EDFA), though the present invention is not limited the type of amplifier used. By placing the amplifier 116 outside of the loop 112, resonant noise in the loop 112 is reduced significantly, increasing the signal to noise ratio.

According to exemplary embodiments of the present invention, all fiber connections to couplers and switches in the circuit shown in FIG. 1 are spliced connections. According to some embodiments, the values n and k may be increased to reduce the total amount of instances when the pulse passes through switch 108, switch 114 and switch 118 to avoid signal loss. According to some instances, the switch 118 may be removed entirely and the loop 120 is composed instead of a long fiber that is n×L1 in length.

The process of recirculating a pulse in the loop 112 n times may be repeated until a desired number of replica pulses are obtained. The amplifier 116 couples the set of replica pulses to a photodetector 117 to obtain the original RF signal expanded in time as a series of pulses delayed by time t1.

The output RF electronic pulse signals from the photodetector 117 is coupled to a data acquisition and processing computer 154. The detail processing and mathematics is described in commonly assigned U.S. application Ser. No. 13/371,556 filed on Feb. 13, 2012, herein incorporated by reference in its entirety.

The RF modulated optical pulse has two side bands around the frequency carrier and therefore contains two copies of the RF modulated pulse. When the pulse enters the fiber optical loop 112, and performs one loop cycle with travel time t1, the two RF side band pulses will travel at a slight relative time delay δt1 between each other due to the chromatic dispersion of the loop 112. According to embodiments of the present invention, N replica pulse pairs are generated by this process. The relative time delay generated between each pulse pairs are, accordingly, δt1, 2×δt1, 3δt1 . . . N×δt1. These pulse replica pairs provide the data points for time-domain auto-correlation performed by the RF analog signal processor 149.

The computer 154, performs an analog to digital conversion on the auto-correlates the replica pulses signal produced by the processor 149, and generates a set of data points 160 which are then stored in memory 157.

The computer 154 also performs data normalization for calibrating on a set of calibration signal with a known RF frequency to produce a weight function for the periodic amplitude changes due to the recirculation loop circuit without RF. In the digital domain, the computer 154 may further normalize the data set from the real signal using that weight function and then uses the transform module 156 to apply a Fourier Transform to transform the normalized auto-correlated data from the time domain to the frequency domain, thereby obtaining the RF spectrum of the input RF pulse 101. In an exemplary embodiment, the memory 157 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

The Fast Fourier Transformed data points 160 generate a channelized frequency spectrum which is obtained using signal processing techniques known to those of ordinary skill in the art.

FIG. 2 is a block diagram of an apparatus 200 for detecting radio-frequency signals using a fiber optic recirculation loop in accordance with another exemplary embodiment of the present invention. In some instances, it is useful to generate a limited number of recirculation pulses; for example, several hundred pulses can be used to quickly provide a low-resolution frequency spectrum and update it rapidly. FIG. 2 depicts apparatus 200 for use in those instances, where a laser modulated by an input RF signal travels through the fiber-recirculation loop via a low-loss, high speed optical switch to generate replica pulses. The replica pulses are then amplified and an RF signal in the time domain is extracted from the replica pulses. The RF signal in the time domain is auto-correlated to generate a set of data points and a transformation is applied to the set of data points to generate a frequency spectrum of the RF input signal 101.

According to an exemplary embodiment of the present invention, the apparatus 200 processes the RF input signal 101 and produces frequency spectrum 258 representing information carried by the input signal 101. The input signal 101 is an RF signal and the laser 202 is a carrier wave light signal.

The RF input signal 101 may be received via a conventional RF front end (not shown) comprising, for example, an antenna, low noise amplifier and various filters. The choice of components and arrangement depends upon the nature of the signals that are to be processed. The selection of components and their arrangement is a design choice capable of being made by anyone with skill in the RF communication arts.

The laser 202 provide laser light of wavelength $\lambda$. The optical modulator 204 modulates light from the laser 202 with the RF input signal 101, creating an RF modulated light wave 205 with two sidebands around the laser carrier in the frequency domain. According to an exemplary embodiment, the laser 202 generates a continuous wave laser. Also according to an exemplary embodiment of the present invention, the optical modulator 204 is a Mach Zehnder modulator. According to yet another embodiment, two lasers with differing wavelengths may be used in place of laser 102. The gate switch 206 (e.g., an optical gate switch) converts the modulated light into a pair of RF modulated optical pulse. Once a pulse enters the gate switch 206, the control circuit 221 causes the gate switch 206 to close so further pulses cannot enter the loop 209 to cause distortion and noise.

The optical pulse generated by the gate switch 206 is coupled to the input port A1 of the 2×1 switch 208. According to exemplary embodiments of the present invention, the switch 208 is a low-loss, high-speed fiber switch. Initially, the switch 208 is set to a first state where the input from port A1 is coupled to the output port of switch 208, thereby coupling the output of switch 208 to the input of a 1×2 coupler 210. According to an exemplary embodiment, the coupler 210 is a weak 1×2 optical splitter with a large splitting ratio, for example 1% to 99%, though other weak ratio couplers may also be substituted. Accordingly, if a 1:99 coupler is used, 99% of the initial pulse is output at port C1 of coupler 210 into the loop 209, where the loop 209 has a length L. Once the initial optical pulse enters loop 209, the control circuit 221 sets the switch 208 to a second state, where input port A2 of switch 208 is coupled to the output port of switch 208, to close the loop 209 allowing the pulse to travel through the loop 209 for a duration of time.

Each time the initial optical pulse cycles through the loop 209, the coupler 210 outputs a small portion for example, 1%, of the optical pulse signal to generate a replica pulse, thereby generating a series pulse train at C2. The pulse train is coupled to the input of an amplifier 212 to amplify the signal. The amplified signal is coupled to a photo-detector 117 to obtain an original RF signal expanded in time as a series of delayed pulses.

The output RF electronic pulse signals from the photodetector 117 is coupled to the RF signal processor 149 and produces the auto-correlation data that is collected by the computer 154. The detail processing and mathematics is described in commonly assigned U.S. application Ser. No. 13/371,556 filed on Feb. 13, 2012, herein incorporated by reference in its entirety.

The RF modulated optical pulse has two side bands around the frequency carrier and therefore contains two copies of the RF modulated pulse. When the pulse enters the fiber optical loop 112, and performs one loop cycle with travel time t1, the two RF side band pulses will travel at a slight relative time delay δt1 between each other due to the chromatic dispersion of the loop 112. According to embodiments of the present invention, N replica pulse pairs are generated by this process. The relative time delay generated between each pulse pairs are, accordingly, δt1, 2×δt1, 3δt1 . . . N×δt1. These pulse replica pairs provide the data points for time-domain auto-correlation performed by the RF signal processor 149.

The computer 154 performs an analog to digital conversion on auto-correlation signal from processor 149, and generates a set of data points 160 which are then stored in memory 157.

The computer 154 also performs data normalization for calibrating on a set of calibration signal with a known RF frequency to produce a weight function for the periodic amplitude changes due to the recirculation loop circuit without RF. In the digital domain, the computer 154 may further normalize the data set from the real signal using that weight function and then use the transform module 156 to apply a Fourier Transform to transform the normalized auto-correlated data from the time domain to the frequency domain, thereby obtaining the RF spectrum of the input RF pulse 101. In, an exemplary embodiment, the memory 157 may include one or more of the following: random access memory, read only memory, magneto-resistive read/write memory, optical read/write memory, cache memory, magnetic read/write memory, and the like, as well as signal-bearing media, not including non-transitory signals such as carrier waves and the like.

According to the embodiments shown in FIGS. 1 and 2, the relative intensity difference between successive pulse replicas is predetermined by the loop circuits loss, including the loss, due to signal splitting and tapping out. To obtain normalized pulse replica data sets, the loss or intensity fluctuation may be experimentally measured by recording the pulse intensity with an un-modulated laser input pulse or a laser input pulse modulated by a single known RF frequency to perform the normalization in the digital domain.

According to an exemplary embodiment, apparatus 200 can be used in conjunction with apparatus 100. In order to perform a "quick" search of a spectrum with low resolution, apparatus 200 is used. Subsequently, the apparatus 100 is used for higher resolution frequency spectrum that performs a "zoom in" function to resolve the signal of interest.

Figure 3:
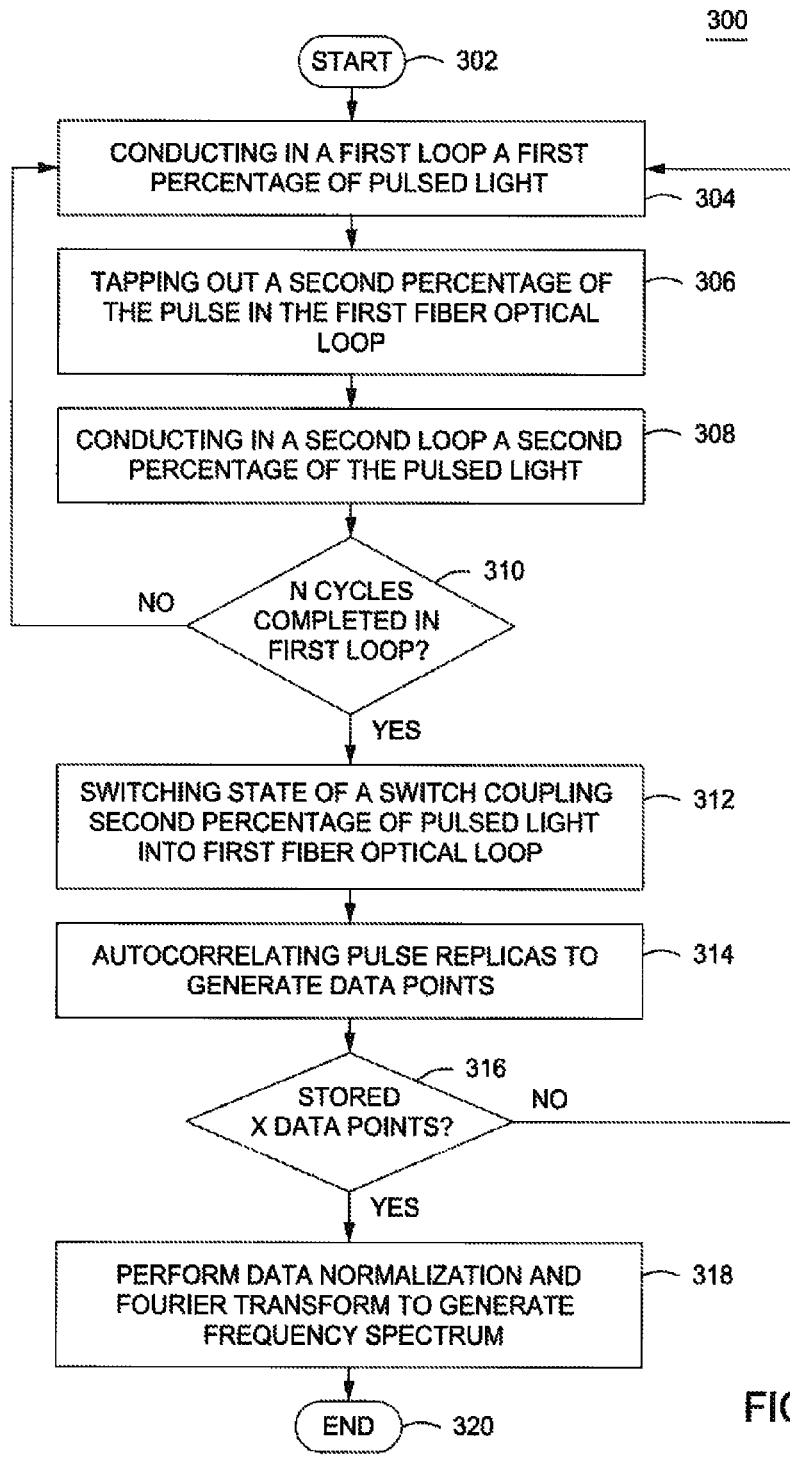
FIG. 3 is a flow diagram of method for detecting radio-frequency signals using optical loops in accordance with exemplary embodiments of the present invention.

FIG. 3 is a flow diagram of method 300 for detecting radio-frequency signals using an optical loop in accordance with exemplary embodiments of the present invention. The method begins at step 302 and proceeds to step 304, where a first percentage of a pulse of one or more modulated laser light beams are conducted in a first fiber optical loop by a coupler, such as coupler 110. At step 306, the coupler taps out a second percentage of the pulse from the first fiber optical loop. At step 308, the second percentage of the pulse is conducted in a second fiber optical loop.

At step 310, the method 300 determines whether the pulse has travelled n cycles in the first fiber optical loop, and if not, the method returns, to step 304. If n cycles have been completed, the method 300 proceeds to step 312. At step 312, a switch is modified to a second state, where a second percentage of the pulse is coupled from the second fiber optical loop back into the first fiber optical loop to augment the intensity of the signal.

At step 314, the tapped out replica pulses are autocorrelated to generate a set of data points. At step 316, the method 300 determines whether a predetermined number of data points have been stored. If a predetermined number (X) of data points have not been stored, the method proceeds to step 304 where more replica pulses are tapped out of the first fiber optical loop. If a predetermined number of data points have been stored, the method proceeds to step 318.

At step 318 the computer 154 performs a data normalization and FFT on the X points to generate a frequency spectrum at step 318. At step 320, the method terminates, when all pulses have been stored and a frequency spectrum has been generated for the input RF signal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Various elements, devices, modules and circuits are described above in associated with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. An apparatus for generating a frequency spectrum of an RF signal comprising:
   a gate switch for generating an output signal pulse within a predetermined time window from a laser of wavelength lambda modulated by an input RF signal;
   a first fiber optical loop for circulating a first percentage of a first pulse of the output signal pulse from the gate switch, for a predetermined number of cycles n where each cycle takes time t1;
   a second fiber optical loop for conducting a second percentage of the first pulse for predetermined number of cycles "k", where each cycle takes time t2, where t2*k=t1*n;
   a low-loss switch with a first state for coupling the first pulse from the gate switch to a coupler that splits the output signal pulse into the first percentage output and the second percentage output, the coupler coupling the first pulse into the first fiber optical loop and tapping replicas of the pulse from the first fiber optical loop, and a second state for coupling the second percentage of the first pulse to recycle back via the second loop to the first loop by the coupler to increase the intensity of the tapped replica pulses; and
   a processor for correlating the replicas of the pulse with each other to produce a set of data points comprising a plurality of multiplexed correlated pulses and transforming the data points into a channelized frequency spectrum of the input RF signal.

2. The apparatus of claim 1, further comprising:
   a second switch, coupled to the coupler, with a first state coupling the coupler output of the second percentage of the first pulse from a first output of the second switch to the second fiber optical loop, wherein the coupler is a 2×2 coupler; and
   a third switch, coupled to a first output of the second switch, with a first state for coupling the second percentage of the first pulse to the second fiber optical loop for k cycles, and after k cycles, a second state for coupling the second percentage of the first pulse to the low-loss switch.

3. The apparatus of claim 2, further comprising:
   an optical amplifier, coupled to a second gate of the second switch, for amplifying received pulse replicas in a second state of the second switch after each cycle of the first pulse circulating in the first fiber optical loop; and
   a photodetector, coupled to the optical amplifier, for detecting the input RF signal in the time domain and coupling the signal to the processor for correlation and transformation.

4. The apparatus of claim 3 wherein the optical amplifier is an Erbium doped fiber amplifier (EDFA).

5. The apparatus of claim 3, further comprising:
   a control circuit, coupled to the gate switch, the low-loss switch, the second switch and the third switch, for synchronizing states of each of the switches.

6. The apparatus of claim 5 wherein all couplings between the coupler and the first switch, the second switch and the third switch are spliced optical fiber connections.

7. The apparatus of claim 2, wherein the coupler is a weak coupler.

8. The apparatus of claim 7 wherein the coupler has a coupling ratio of 5:95%.

9. The apparatus of claim 8, wherein the first percentage is 5% and the second percentage is 95%.

10. The apparatus of claim 1, wherein the first percentage is 5% and the second percentage is 95%.

11. The apparatus of claim 1, wherein the laser is modulated using a Mach Zehnder modulator.

12. The apparatus of claim 1, wherein the length of the second optical loop is approximately 8 to 50 times the length of the first optical loop.

13. The apparatus of claim 1, wherein the first pulse circulates through the second optical fiber loop one to ten times.

14. The apparatus of claim 1 wherein a length of the first fiber optical loop is greater than a pulse width in the series of pulses generated by the gate switch.

15. An apparatus for generating a frequency spectrum of an RF signal comprising:
   a gate switch for generating an output signal pulse from a laser of wavelength lambda modulated by an input RF signal using a Mach Zehnder modulator;
   a fiber optical loop having a length of approximately 1 Km;
   for circulating a first pulse of the output signal pulse from the gate switch, for a predetermined number of cycles n where each cycle takes time t1;
   a low-loss high-speed fiber optical switch where the switch is approximately faster than a microsecond, coupled to the gate switch, in a first state for coupling the output signal pulse from the gate switch to a coupler said coupler having a coupling ratio of 1% to 99%, where the first percentage is 1% and the second percentage is 99%, the coupler tapping out a first percentage of the output signal pulse from the fiber optical loop as a replica pulse and coupling a second percentage of the output signal pulse into the first fiber optical loop, and a second state for coupling the fiber optical loop to the coupler; and a processor for correlating a predetermined amount of replicas of the pulse with each other to produce a set of data points comprising a plurality of multiplexed correlated pulses and transforming the data points into a channelized frequency spectrum of the input RF signal wherein further comprising:

a control circuit configured to synchronize the gate switch and the low-loss high speed fiber optical switch.

16. A method for determining a channelized frequency spectrum from an RF signal comprising:

conducting, in a first fiber optical loop, a first percentage of a pulse an RF modulated laser light generated by modulating a carrier laser with an RF input signal, for a predetermined number of cycles n, each cycle equal to a time period t1;

conducting, in a second fiber optical loop, a second percentage the pulse, for a predetermined number of cycles k, each cycle equal to a time period t2, where $t2*k=t1*n$;

switching state of a switch to a state configured to permit the second fiber optical loop after $n*t1$ cycles to couple the second percentage of the pulse into the first fiber optical loop to increase the intensity of the pulse in the first fiber optical loop;

tapping out, after every cycle, a pulse replica of the pulse in the first fiber optical loop, forming a set of pulse replicas;

generating a frequency spectrum from the set of pulse replicas by autocorrelating the pulse replicas to generate data points and applying a Fourier Transform to the autocorrelated data points.

\* \* \* \* \*